United States Patent

Simon

(10) Patent No.: US 7,975,510 B2
(45) Date of Patent: Jul. 12, 2011

(54) I.S. MACHINE

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 465 days.

(21) Appl. No.: 11/445,894

(22) Filed: Jun. 2, 2006

(65) Prior Publication Data

US 2007/0277557 A1    Dec. 6, 2007

(51) Int. Cl.
C03B 9/30 (2006.01)
C03B 9/347 (2006.01)
C03B 9/38 (2006.01)
C03B 9/40 (2006.01)

(52) U.S. Cl. .......................................... 65/267; 65/357

(58) Field of Classification Search ................ 65/264, 65/357, 359
See application file for complete search history.

(56) References Cited

U.S. PATENT DOCUMENTS

| 1,976,239 | A | * | 10/1934 | Lorenz et al. ................ 65/224 |
| 2,161,255 | A | * | 6/1939 | Howard ........................ 65/64 |
| 2,744,358 | A |   | 5/1956 | Rowe |
| 4,599,099 | A | * | 7/1986 | Jones .......................... 65/29.1 |
| 4,983,203 | A |   | 1/1991 | Erb et al. |
| 5,824,131 | A |   | 10/1998 | Grant et al. |

* cited by examiner

*Primary Examiner* — Matthew J Daniels
*Assistant Examiner* — Cynthia Szewczyk
(74) *Attorney, Agent, or Firm* — Reinhart Boerner Van Deuren s.c.

(57) ABSTRACT

An I. S. Machine is provided wherein the blow molds are closed to a slightly cracked location whereby applied cooling air can not leak into and pressurize the blow mold thereby damaging the parison during reheat. When reheat is completed, the blow molds are fully closed and the parison is transformed into a bottle by applying compressed air and/or vacuum.

5 Claims, 4 Drawing Sheets

I.S. MACHINE

The present invention relates to I. S. Machines for forming glass bottles from gobs of molten glass.

BACKGROUND OF THE INVENTION

In an I. S. Machine, a gob of molten glass is delivered to a blank mold in which a "parison" is formed. The formed parison includes the "finish", i.e., the threads, etc. of the bottle to be formed which are at the bottom of the vertically standing parison. The parison also has an elongated vertical hole which extends upwardly from the finish. The finish is gripped by neck ring molds carried by a pair of closed neck rings. When the blank mold is opened, the neck ring is rotated 180 degrees to deliver the parison to the blow station where opposed blow molds will be displaced into a clamped closed position about the parison. The finish, and hence the parison, is supported by the closed blow molds. Reheat then takes place, i.e., the skin of the parison which had been cooled to preserve the shape of the parison, is heated by the inner heat of the parison. When this happens the parison will sag or stretch downwardly by virtue of the parison being suspended from the molds. When the parison stretches to the desired length, either compressed air is introduced into the mold via a blow head sitting on top of the blow molds and/or vacuum is applied through the walls of the blow mold to displace the parison into the form of the mold.

Often cooling air is directed upwardly through the side walls of the blow molds to remove heat from the molds. It has been suggested that such air tends to leak into the blow mold and heated by the parison creates a large pressure that tends to collapse the parison so that instead of a continuous hole the hole is closed at some central location bringing one side of the parison into engagement with the other side of the parison. Should this happen, a "birdswing" can form when the parison is blown which is a defect requiring the rejection of the ultimately formed bottle.

To avoid birdswings, operators conventionally delay the start of cooling air until the parison has been blown but this slows down the cycle time and this is undesirable.

OBJECT OF THE INVENTION

It is accordingly an object of the present invention to provide a better solution for this problem.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
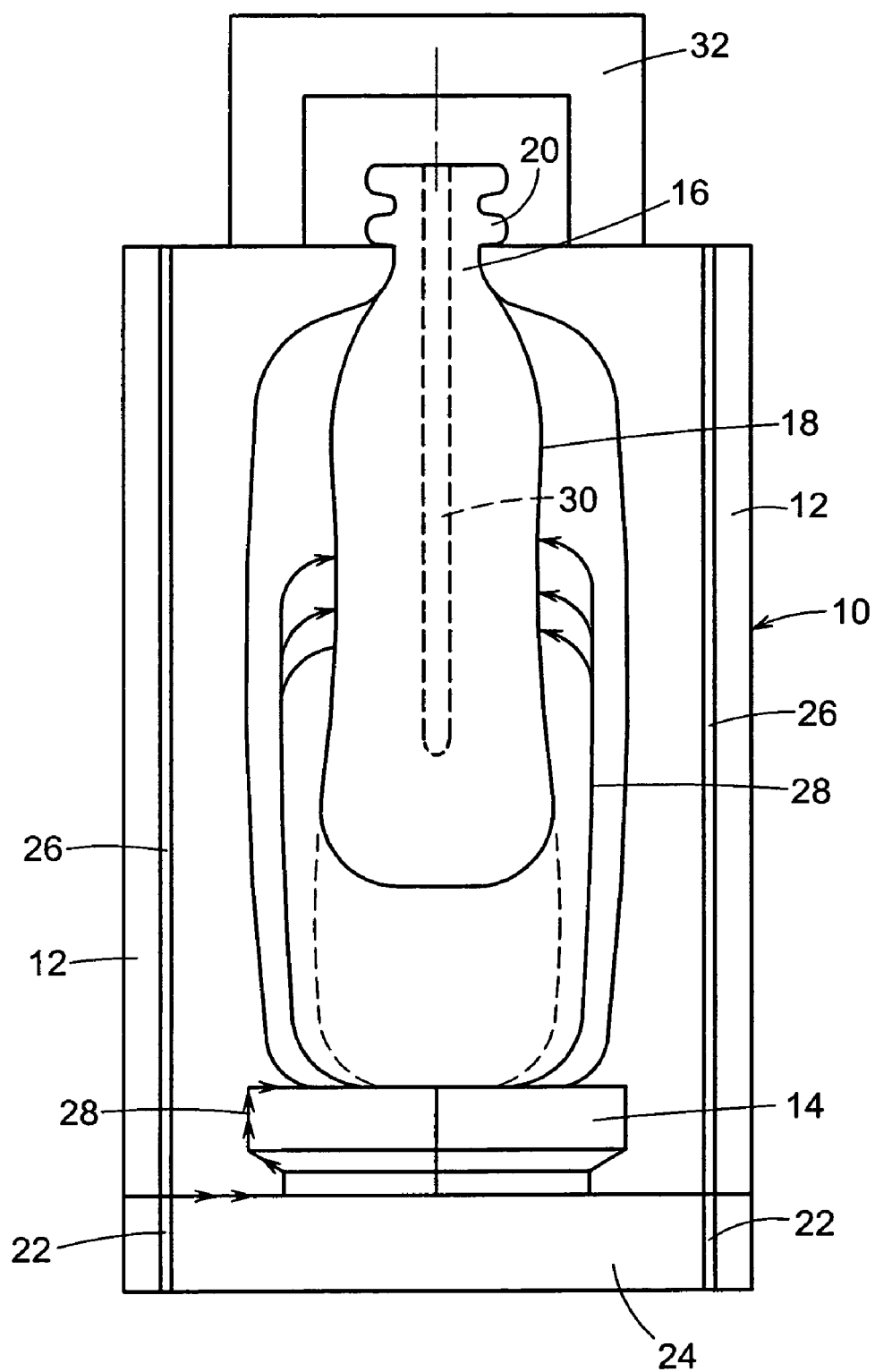
FIG. 1 is a side elevational view of a conventional blow mold of an I. S. Machine closed about a parison.

Each section of an I. S. Machine forms one or more gobs of molten glass into a bottle. For each gob there will be a blank mold for forming a gob into a parison and a blow mold for forming the parison into a bottle. A blow mold 10 is shown in FIG. 1 which is made up of an opposed pair of side molds 12 and a bottom plate 14 which interfits with the side molds when the side molds are fully closed as shown. As shown, the fully closed blow mold sides grip the neck 16 of a parison 18. The finish 20 of the parison was held by the neck rings of an invert mechanism until the parison became supported by the blow mold. The neck rings then opened and were displaced back to the blank molds.

The parison, which has a long hole 30 extending downwardly from the top, will reheat, i.e., the chilled skin will be heated by the internal heat of the parison, and once reheated the parison will begin to stretch downwardly. When the parison stretches down to the bottom plate as shown in dotted lines, the parison will be transformed into a bottle either by applying vacuum to the inside surface of the mold or by applying air pressure via a blowhead 32 located on top of the blow mold.

Cooling air is supplied to vertical holes 22 in the base 24 for the bottom plate 14 and these holes communicate with cooling holes 26 extending vertically through the blow mold sides 12. When a source of pressurized air is turned on cooling air will be forced through these cooling holes to remove heat from the blow mold sides. It is believed that this cooling air bleeds between the bottom surface of the blow mold and the top surface of the base and works its way between the bottom plate and the side molds into the interior of the blow mold and that this leakage expands due to the heat of the parison and acts to crush the parison ultimately causing a birdswing in the formed bottle. These pressure forces are illustrated with arrows 28.

Figure 2:
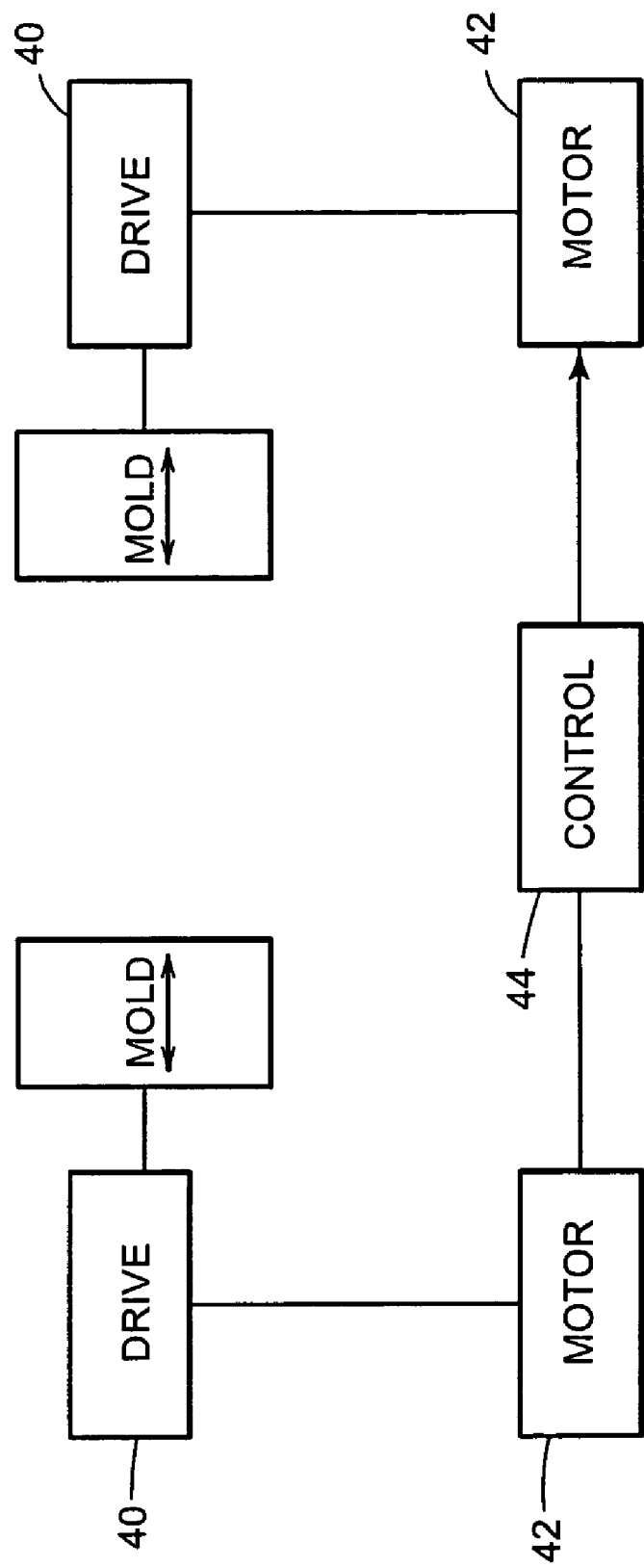
FIG. 2 is a schematic showing a conventional blow mold open and close mechanism.

A conventional blow mold open and close mechanism is shown in FIG. 2 where a pair of opposed side molds 12 are supported for displacement toward and away from each other. Displacement is via a drive 40 powered by a motor 42. Motion is controlled by a suitable control 44.

Figure 3:
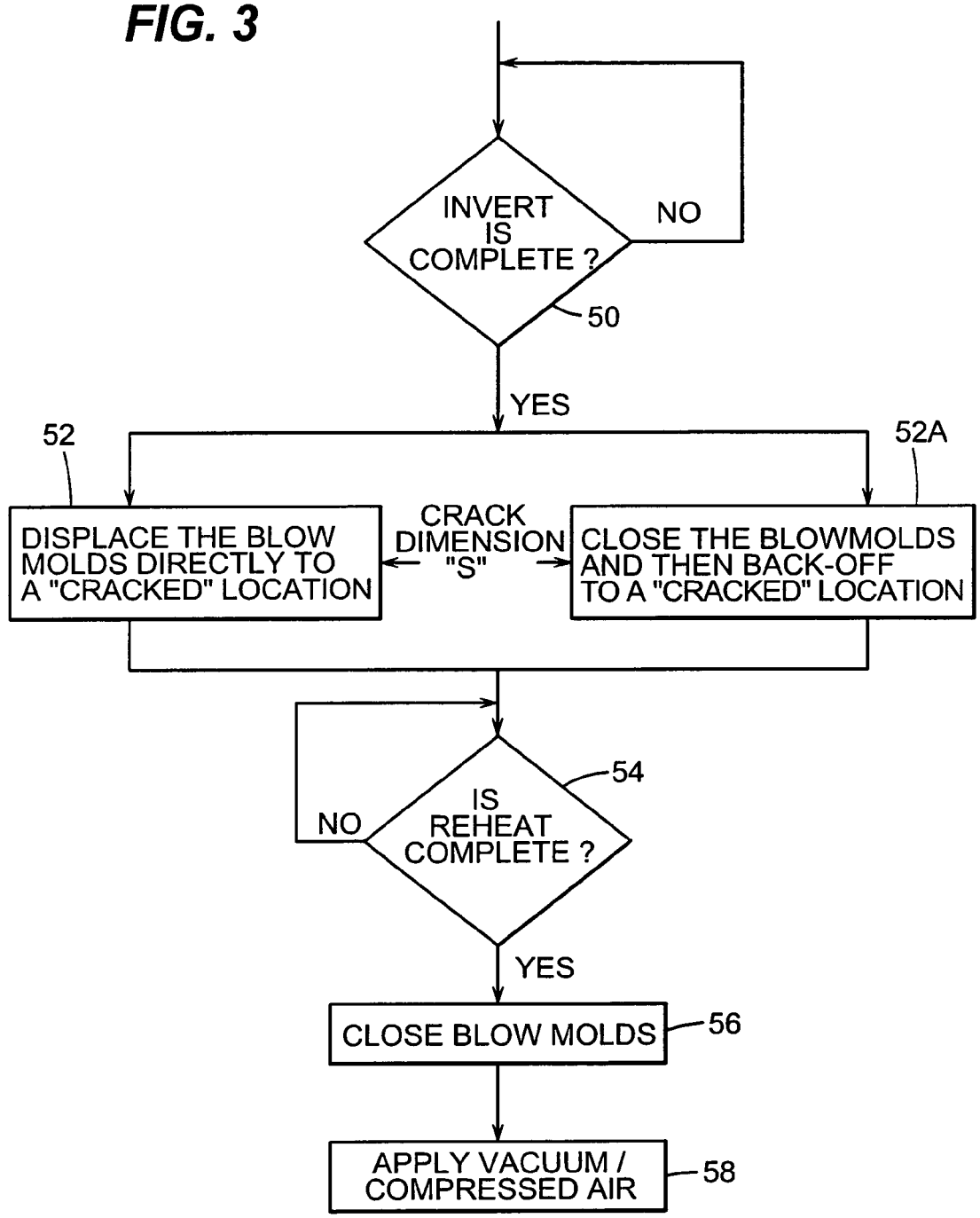
FIG. 3 is a logic diagram illustrating the operation of the control for the blow mold open and close mechanism.
Figure 4:
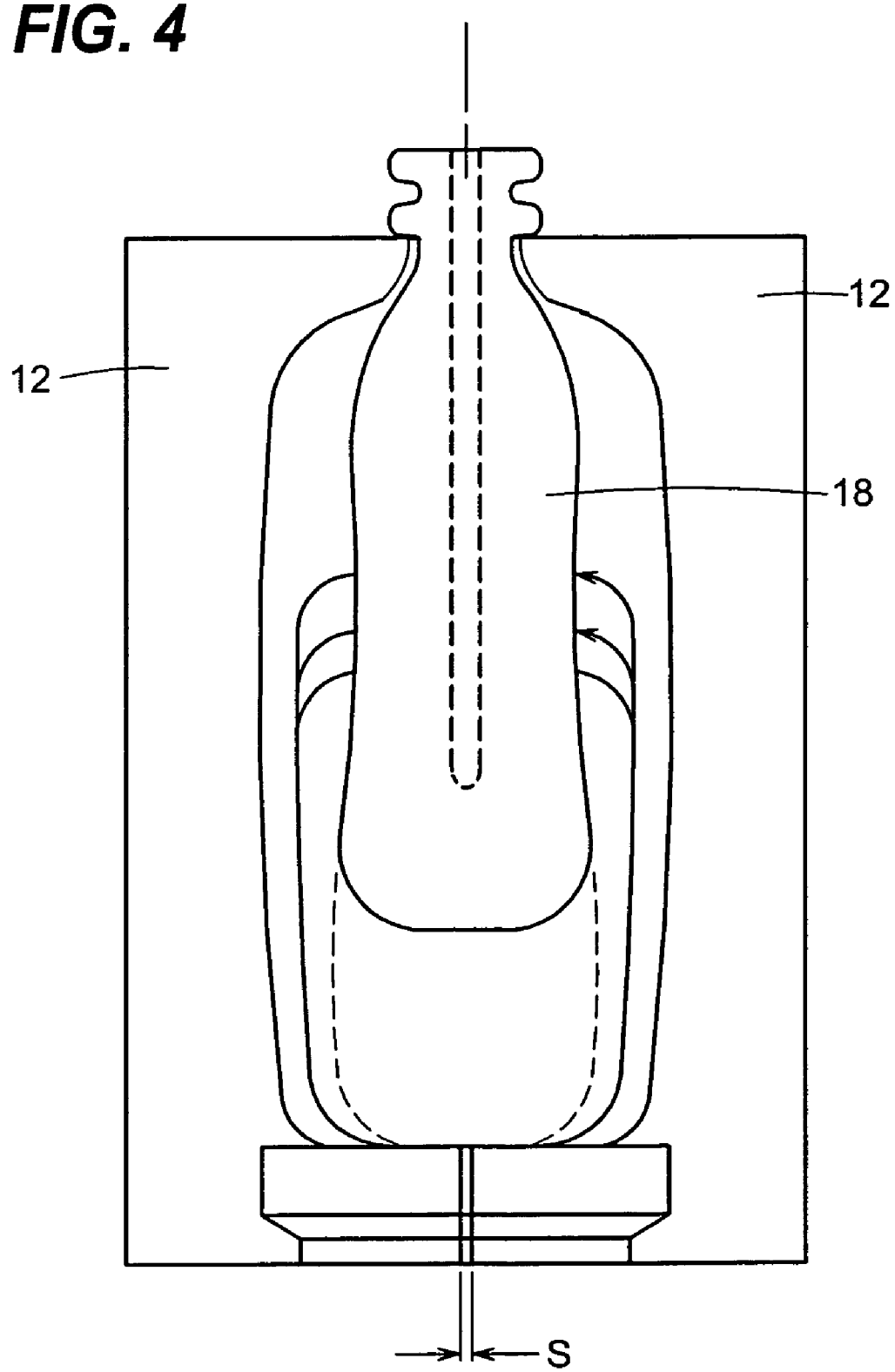
FIG. 4 is a view similar to that of FIG. 1 with the blow molds cracked during reheat.

In accordance with the invention, when "Invert Is Complete?" 50 (This will be a time observed by an operator who is defining the event angles around a 360 degree timing drum—at this time the operator will see that the parison is located at the blow station and that the blow molds can be closed), the Control 44 will Displace The Blow Molds Directly To A Cracked Location 52. FIG. 3 shows this cracked location where "S" represents the crack or separation between the blow molds. This separation, which can be set by the operator, will be limited so that the top of the molds will continue to support the finish of the bottle. This could be a one step feed process to the cracked location or the control can Close The Blow Molds And Than Back-off To A "Cracked" location 52A. The crack only has to be wide enough to prevent the pressurization of the mold between the parison and the inner mold surface.

When the query "is Reheat Complete" 54 is answered yes (which can be an automated function or determined by the operator), which means that it is time for the parison to be formed into a bottle, the Control 44 will Close Blow Molds 56 and then Apply Vacuum/Compressed Air 58 to transform the parison into a bottle in the blow molds.

The invention claimed is:

1. An I.S. Machine including a blow station whereat a parison having a formed finish is transformed into a container within a blow mold including a pair of opposed side molds that are movable towards and away from each other, comprising an open and close mechanism for displacing the side molds from a remote location to a closed position, control means configured to operate when a parison is located at the blow station and configured to operate the open and close mechanism to displace the side molds from the remote location to a cracked position around the parison whereat a selected separation exists there between, and to maintain the side molds at the cracked position during reheating of the parison, said separation being controlled by the control means so that when a parison is located within the blow mold with the side molds located at the cracked position, the side molds will support the finish of the parison without neck ring holders while the parison reheats, and said control means further configured to subsequently operate the open and close mechanism to displace said side molds to the closed position at the conclusion of the parison reheating and then causing the parison to be blown into a container in the closed blow mold.

2. An I.S. Machine according to claim 1, wherein the control means is configured to operate the open and close mechanism to displace the side molds to the cracked position by first operating the open and close mechanism to displace the side molds to a closed position and then operating the open and close mechanism to displace the side molds to the cracked position.

3. An I.S. Machine according to claim 1, wherein the control means operates the open and close mechanism to displace the side molds to the cracked position by operating the open and close mechanism to displace the side molds directly to the cracked position without first operating the open and close mechanism to displace the side molds to the closed position.

4. An I.S. Machine according to claim 1, wherein the separation is sufficiently wide to prevent the pressurization of the blow mold between the parison and inner surfaces of the blow mold.

5. An I.S. Machine according to claim 1, wherein the separation is adjustable by an operator.

* * * * *